Nov. 25, 1952 — C. L. COOK ET AL — 2,618,980
OFFSET DRIVE FOR TRACTORS
Filed April 7, 1950 — 2 SHEETS—SHEET 1
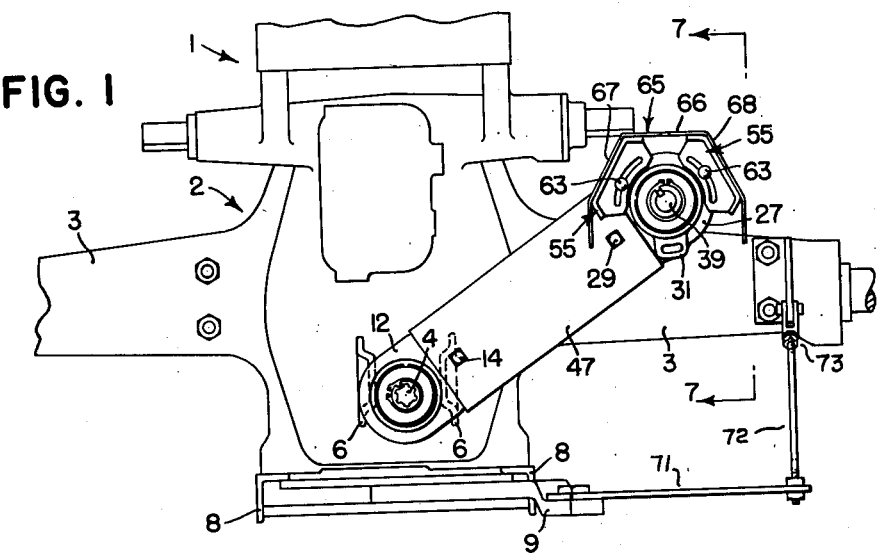
FIG. 1
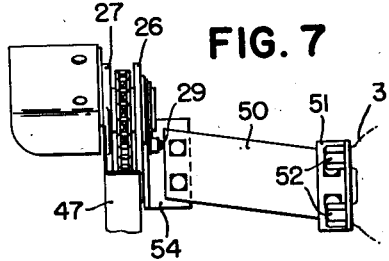
FIG. 7
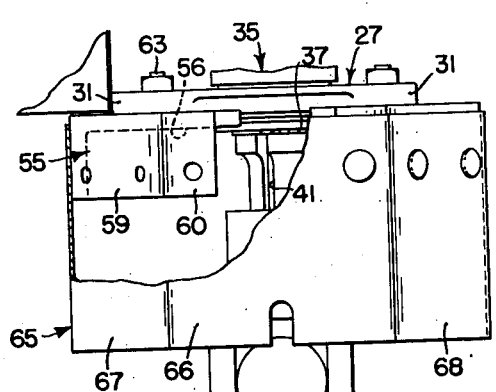
FIG. 6
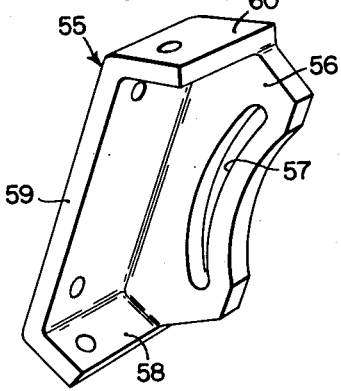
FIG. 5
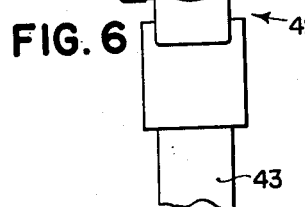
INVENTORS.
CURTISS L. COOK
AUSTIN E. YOUNG
BY
ATTORNEYS Nov. 25, 1952     C. L. COOK ET AL     2,618,980
OFFSET DRIVE FOR TRACTORS Filed April 7, 1950     2 SHEETS—SHEET 2

*INVENTORS.*
CURTISS L. COOK
AUSTIN E. YOUNG

BY
ATTORNEYS

Patented Nov. 25, 1952

2,618,980

UNITED STATES PATENT OFFICE 2,618,980

OFFSET DRIVE FOR TRACTORS

Curtiss L. Cook and Austin E. Young, Syracuse, N. Y., assignors to Syracuse Chilled Plow Co., Inc., Syracuse, N. Y., a corporation of New York Application April 7, 1950, Serial No. 154,576

2 Claims. (Cl. 74—15.6)

1

The present invention relates generally to agricultural machines and is more particularly concerned with power take-off devices attachable to a farm tractor for the purpose of delivering power from the motor of the tractor to an implement.

The object and general nature of the present invention is the provision of a new and improved power take-off attachment by which power may be delivered to a farm implement, such as a potato digger, and more specifically, it is an important feature of this invention to provide a power take-off attachment especially constructed and arranged for delivering power to a farm implement hitched in offset relation to the tractor. Specifically, it is a feature of this invention to provide a power take-off attachment which is easily and quickly attached to or disconnected from a tractor, and to this end the power take-off attachment of the present invention is so constructed and arranged as to be supported at one end on the tractor power take-off shaft, the attachment being connected with the tractor only at one point, spaced from the power take-off shaft of the tractor so as to take care of torque loads. More particularly, it is a feature of this invention to provide a power take-off attachment which can easily and quickly be mounted on the tractor or detached therefrom by sliding one portion of the attachment onto the power take-off shaft, which is usually splined.

Another important feature of the present invention is the provision of a power take-off attachment which may easily and quickly be mounted on or disconnected from various kinds and/or sizes of tractors and, in conjunction therewith, it is a further feature of this invention to provide a safety shield support adapted to be carried by and form a part of the power take-off attachment, which support is readily adjustable so as to dispose the shield or guard in the proper position, relative to the associated power shaft parts, such as the universal joint, regardless of the position of the power take-off attachment relative to the tractor.

These and other objects and advantages of the present invention will be apparent to those skilled in the art after a consideration of the following detailed description, taken in conjunction with the accompanying drawings in which a preferred form of the present invention has been shown by way of illustration.

In the drawings:

Figure 1 is a rear view of a power take-off attachment in which the principles of the present invention have been incorporated, showing the same as mounted in position on a tractor;

2

Figure 5 is a perspective view of one of the two guard supports which are adjustably mounted on the rear outer bearing plate member and provide for the disposition of the universal joint shield in a position substantially directly above the auxiliary power take-off shaft of the offset power drive attachment.

Figure 6 is a fragmentary plan view showing the shield-receiving bracket structure mounted at the upper end of the power take-off device.

Figure 7 is a side view taken generally along the line 7—7 of Figure 1.

Figure 2:
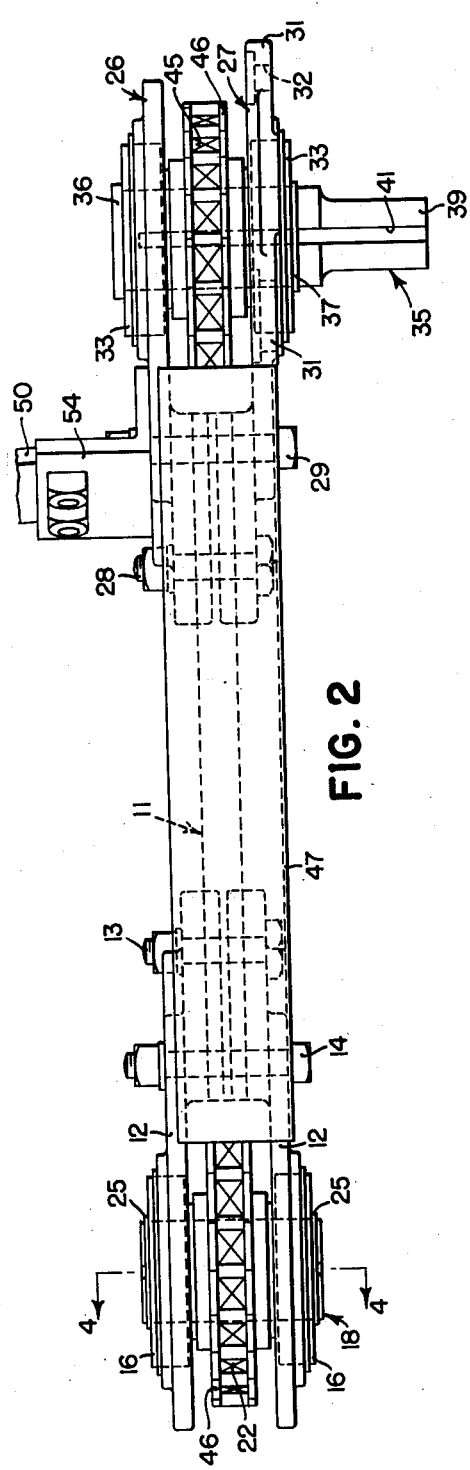
Figure 2 is a plan view of the power take-off attachment shown in Figure 1.
Figure 3:
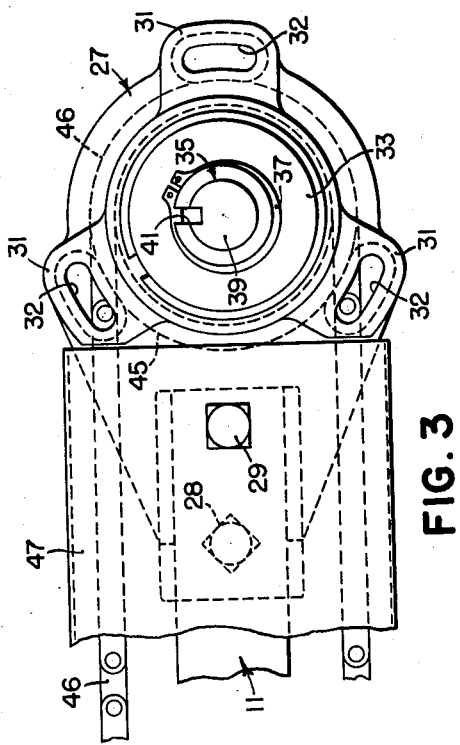
Figure 3 is an enlarged section taken generally along the line 3—3 of Figure 2.
Figure 4:
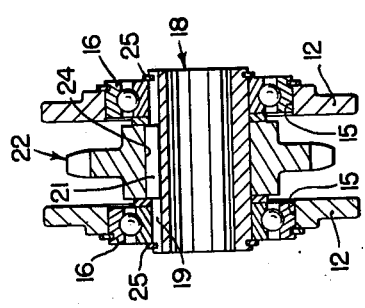
Figure 4 is a sectional view taken generally along the line 4—4 of Figure 2.

Referring now to the drawings, particularly Figure 1, the power take-off attachment is adapted to be mounted on a tractor indicated in its entirety by the reference numeral 1, having a rear axle structure 2, which includes laterally outwardly extending rear axle housings 3, and a rearwardly extending power take-off shaft 4 that is disposed between a pair of bracket portions 6 provided for the purpose of receiving a safety shield, to be referred to later, which in conventional use of the tractor is mounted on the bracket portions 6 so as to be disposed above the power take-off shaft 4, particularly above the universal joint (not shown) which normally connects a rearwardly extending power shaft (not shown) to the tractor power take-off shaft 4. The rear axle structure 2 of the tractor carries a drawbar support 8 the latter being fixed to the rear axle structure in any suitable way, and swingable laterally in the drawbar support 8 is a swinging drawbar 9. Normally, in conventional use of the tractor, an implement, having operating parts or the like adapted to be driven from the tractor power take-off shaft 4, is hitched to the drawbar 9 so as to be disposed rearwardly of the tractor in the generally central longitudinally extending axis thereof, whereby the power shaft may readily be connected to the centrally disposed and rearwardly extending tractor power take-off shaft 4. However, it is sometimes desired to hitch an implement in an offset relation with respect to the tractor, such as, for example, a one-row potato digger having elevator chain means and/or other mechanism adapted to be driven by power derived from the tractor power take-off shaft 4. Where the implement is hitched to the tractor in laterally offset relation, it is desirable to provide an offset drive arrangement so as to eliminate excess angularity in the power shaft leading to the implement and in order not to interfere with turning of the tractor relative to the implement. The present invention is primarily concerned with the provision of a new and improved offset drive arrangement, one preferred form of which will now be described.

The offset drive of the present invention comprises a support member 11 to the laterally inner end of which a pair of bearing brackets 12 are fixed, as by a short bolt 13 and a longer bolt 14. Each bearing bracket includes an enlarged apertured section 15 adapted to receive an antifriction bearing unit 16. Normally, the power take-off shaft 4 of the tractor is provided with external splines, and according to the present invention an internally splined sleeve 18 is adapted to be slipped onto the power take-off shaft of the tractor. The bushing or sleeve 18 is formed with a keyway 19 adapted to receive a key 21 by which a drive member in the form of a sprocket 22 is adapted to be mounted. The hub of the sprocket 22 is provided with a keyway 24 to receive the key 21. The ends of the sleeve or bushing 18 are milled to receive snap rings 25 which, cooperating with the bearing units 16, serve to hold the sleeve 18 with the sprocket 22 in position between the bearing members 12.

At its outer end the spacer or support bar 11 receives a second pair of bearing brackets 26 and 27 which are fixed to the outer end of the bar 11 by a short bolt 28 and a longer bolt 29. The bearing brackets 26 and 27 are substantially identical with the bearing brackets 12 described above, except that the rearward bearing bracket 27 is provided with three radially outwardly extending lugs 31, each of which is provided with an arcuate slot 32, the purpose of which will be described later. The bearing brackets 26 and 27 are provided with enlarged apertured sections receiving antifriction bearing units 33, preferably identical with the units 16 mentioned above. The bearing units 33 receive an auxiliary power take-off stub shaft 35 which is held in position by a flange 36 at its forward end and a snap ring 37 disposed in a milled annular slot at the other end of the stub shaft, the flange and snap ring cooperating with the associated bearing units 33 to prevent axial displacement of the auxiliary stub shaft 35 relative to the supporting member 11. The rear portion 39 of the shaft 35 is reduced in diameter and is provided with a keyway 41 by which a universal joint 42 at the front end of the implement power shaft 43 may be connected to the stub shaft 35. A sprocket 45 is keyed to the inner end portion of the stub shaft 35 between the bearing brackets 26 and 27, and a drive chain 46 connects the two sprockets 22 and 45 in driving relation. A channel-like shield 47 is apertured to receive the longer bearing bracket attaching bolts 14 and 29 by which the shield 47 is held in place on the spacer member 11 in a position surrounding the drive chain 46.

The entire offset drive unit is carried at its inner end on the tractor power take-off shaft 4 and can be swung to different positions relative to the tractor about the axis of the power take-off shaft, whereby the auxiliary power take-off shaft 35 may be disposed in various laterally and vertically spaced positions relative to the central power take-off shaft 4 of the tractor. For the purpose of holding the offset drive unit in position and to take the torque, a plate 50 is used to attach the offset drive unit to the adjacent tractor rear axle extension 4. The lower end of the plate 50 is bolted to an angle 51 that is fixed to the rear axle extension 3 by the usual tractor attaching studs 52. The other end of the plate 50 is connected by bolts to an angle 54 which is apertured to receive the end of the bolt 29, as best shown in Figures 2 and 7. Thus, the spacer or support bar 11, with associated parts, is held against rearward displacement relative to the power take-off shaft 4 of the tractor. The offset drive unit of the present invention may readily be connected and disconnected, as desired. Also, the unit may be mounted on various makes and sizes of tractors, since usually the power take-off shafts of such tractors are standardized.

Inasmuch as it is always desirable to protect rotating parts by shields or the like, particularly the universal joints, the present invention includes means providing for the proper mounting of the protecting shields and associated parts on the outer end of the offset drive unit, irrespective of the different positions in which the outer end may be disposed to accommodate different tractors and/or different implements. To this end, a pair of angle brackets 55 are provided, each having a flange section 56 in which an arcuate slot 57 is formed. The other flange of each angle bracket 55 has angularly related sections 58, 59, and 60, each being apertured. Each angle bracket 55 is adapted to be mounted on one of the slotted lugs 31 of the upper rear bearing bracket 27 by any suitable means, such as one or more bolts 63. Preferably, a pair of angle brackets 55 are provided and according to the present invention they are so mounted on the slotted portions of the bearing brackets 29 as to receive a safety shield or guard support 65 which is provided with an upper normally horizontal portion 66 and downwardly and outwardly extended side portions 67 and 68. These portions are apertured to receive bolt or other means by which the usual shield or guard 70 may be mounted substantially directly above the stub shaft or auxiliary power take-off shaft 35. By loosening the bolts 63 and adjusting the position of the angle brackets 55, the shield or guard support 65 may be brought into a position substantially directly over the auxiliary power take-off shaft, irrespective of the particular position or angle at which the offset drive unit is carried on the tractor. In this way, the flat or upper portion 66 of the guard support 65 is or can be arranged parallel with the rear axle center line or ground line, and thus be in the proper position to receive extension shields or the like over the implement power shaft.

For connecting the implement to the tractor in laterally offset relation, an offset hitch is usually necessary, and as best shown in Figure 1, we provide an offset hitch which consists of a plate 71 bolted to the rear end of the tractor drawbar 9 when it is moved as far as possible to one side of the tractor. A truss rod 72 is connected at its lower end to the plate and at its upper end to a threaded yoke 73 that is attached to the rear axle extension 3, preferably by one or more of the usual implement-receiving studs carried thereby.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim and desire to secure by Letters Patent is:

1. A power take-off attachment for a tractor having a rearwardly extending power take-off shaft at the rear of the tractor, said attachment comprising a driving member attachable to said shaft, a spacer member, means for swingably supporting one end of said spacer member for movement about the axis of said shaft, a driven member rotatably carried at the other end of said spacer member, drive means connecting said driving and driven members, a stub shaft carried by said driven member and extending rearwardly from said spacer member, means for supporting the outer end of said spacer member on the tractor at a point spaced from the longitudinal axis of the power take-off shaft, a guard support attachable to the outer end of said spacer member, and means for fixing said guard support to said spacer member in different positions about the axis of said stub shaft, whereby said guard support may be disposed above said stub shaft in different angular positions of the spacer member relative to the horizontal.

2. A power take-off attachment for a tractor having a rearwardly extending power take-off shaft at the rear of the tractor, said attachment comprising a spacer bar, a pair of bearing members attachable to the inner end of said spacer bar and having apertured portions adapted to receive said power take-off shaft, means for swingably supporting said bearing members on said power take-off shaft, a pair of bearing members fixed to the outer end of said spacer bar, an auxiliary power take-off shaft rotatably supported by said bearing members, means for driving said auxiliary power take-off shaft from said tractor power take-off shaft, comprising rotatable parts disposed between the bearing brackets at the inner and outer ends of said spacer bar, one of the outer bearing members having bracket-receiving means, and a guard bracket attachable to the bracket-receiving means of said outer bearing member and adjustable relative thereto about the axis of said auxiliary power take-off shaft.

CURTISS L. COOK.
AUSTIN E. YOUNG.

REFERENCES CITED

The following references are of record in the file of this patent:

UNITED STATES PATENTS

| Number | Name | Date |
|---|---|---|
| 954,400 | Palmer | Apr. 5, 1910 |
| 1,612,043 | Nonneman | Dec. 28, 1926 |
| 1,874,261 | Evelyn | Aug. 30, 1932 |
| 1,889,600 | Hansen | Nov. 29, 1932 |
| 1,890,975 | Erdahl | Dec. 13, 1932 |
| 1,903,120 | Lafferty | Mar. 28, 1933 |
| 2,248,256 | Stageman | July 8, 1941 |
| 2,451,440 | Lidington | Oct. 12, 1948 |

FOREIGN PATENTS

| Number | Country | Date |
|---|---|---|
| 399,638 | Germany | Aug. 7, 1924 |